US011785469B1

(12) United States Patent
Gendler

(10) Patent No.: US 11,785,469 B1
(45) Date of Patent: Oct. 10, 2023

(54) SECURE MDM SYSTEM FOR MACOS, SECURE MDM PLATFORM, SECURE MACOS MOBILE DEVICE AND RELATED METHOD

(71) Applicant: Bob Gendler, Medfield, MA (US)

(72) Inventor: Bob Gendler, Medfield, MA (US)

(73) Assignee: Gendler Software LLC, New Paltz, NY (US)

(*) Notice: Subject to any disclaimer, the term of this patent is extended or adjusted under 35 U.S.C. 154(b) by 0 days.

(21) Appl. No.: 18/129,224

(22) Filed: Mar. 31, 2023

Related U.S. Application Data

(60) Provisional application No. 63/441,242, filed on Jan. 26, 2023.

(51) Int. Cl.
*H04M 1/66* (2006.01)
*H04W 12/37* (2021.01)
*G06F 21/62* (2013.01)
*H04W 12/69* (2021.01)

(52) U.S. Cl.
CPC ............ *H04W 12/37* (2021.01); *G06F 21/62* (2013.01); *H04W 12/69* (2021.01)

(58) Field of Classification Search
CPC ............................... G06F 21/62; H04W 12/37
See application file for complete search history.

(56) References Cited

U.S. PATENT DOCUMENTS 9,807,165 B1 * 10/2017 Hiremath ............ H04L 67/1095
2013/0007245 A1 * 1/2013 Malik ................. H04L 41/0816 709/223
2014/0040197 A1 * 2/2014 Wijayaratne .......... G06F 16/178 707/625
2016/0191567 A1 * 6/2016 Chahal .................... G06F 21/44 726/1
2018/0034822 A1 * 2/2018 Mistry .................. H04W 12/37
(Continued)

OTHER PUBLICATIONS

"Intro to mobile device management profiles," Oct. 24, 2022, last accessed on Jul. 11, 2023, https://support.apple.com/guide/deployment/intro-to-mdm-profiles-depc0aadd3fe/web.
(Continued)

*Primary Examiner* — Shantell L Heiber
(74) *Attorney, Agent, or Firm* — Davidson, Davidson & Kappel, LLC

(57) ABSTRACT

An MDM management system to manage files outside the scope of MDM for macOS, the management system. The system has an MDM platform for managing a plurality of mobile devices each with a macOS operating system, the MDM manager allowing for creation of configuration profiles for an array of files outside of the scope of MDM for macOS and the configuration profiles having defined content settings. The MDM manager manages a plurality of managed mobile devices having a file manager agent to receive the array of configuration profiles from the MDM manager, the mobile devices each having a module to detect a change in the file outside the scope of MDM for macOS and when the change occurs to check a content change against the defined content settings, and if the change deviates from one of the defined content settings, returning the file to the defined content settings of the configuration profile.

16 Claims, 2 Drawing Sheets

(56) References Cited

U.S. PATENT DOCUMENTS

2021/0109896 A1* 4/2021 Shemer .............. G06F 11/1471

OTHER PUBLICATIONS

Firestein et al: "The Kandji Agent and MDM,"https://support.kandji.io/support/solutions/articles/72000560409-the-kandji-agent-and-mdm, Apr. 19, 2020, last accessed on Jul. 11, 2023.
"Automate macOS, iOS and Apple TV device management." Mobile Device Management, Oct. 15, 2016; https://www.jamf.com/solutions/device-management; last accessed on Jul. 11, 2023.
Johnny Evans:"Mosyle introduces new MDM services for Apple enterprise," New Analysis, Computerworld; May 4, 2022, https://www.computerworld.com/article/3659003/mosyle-introduces-new-mdm-services-for-apple-enterprise.html; last accessed on Jul. 11, 2023.
Scott Reed: "JumpCloud's Apple MDM Solution," Jumpcloud, May 21, 2022; https://jumpcloud.com/blog/apple-mdm; last accessed on Jul. 11, 2023.

* cited by examiner

SECURE MDM SYSTEM FOR MACOS, SECURE MDM PLATFORM, SECURE MACOS MOBILE DEVICE AND RELATED METHOD

This claims priority to U.S. Provisional Patent Application No. 63/441,242, filed Jan. 26, 2023 and hereby incorporated in its entirety herein.

BACKGROUND

Mobile Device Management (MDM) systems allow information technology (IT) administrators to control and enforce enterprise-wide policies on tablets, phones, laptops and other devices including desktop devices. For example, a company may issue 40 cell phones and 30 laptops and 10 desktops computers, called mobile devices even if not fully mobile, to employees. An MDM system manages such devices. Security is a key issue for such MDM systems, and administrators for example may want to forbid use of the camera or forbid Bluetooth capability on the mobile devices.

Apple has a unique ecosystem for MDM, since its cell phones, iPhones, use downloads from its approved App store, and thus are generally regarded as secure. The operating software on its iPhones, Apple iOS, allows for MDM management of the iPhones enrolled in an MDM system.

However, Apple laptop and desktop computers run macOS as an operating system and generally allow for unapproved third-party software to be downloaded and installed. Apple has MDM for macOS, to permit enrolled devices to be managed. However, only certain approved files, settings and values of Apple laptop and desktop computers are within the scope of MDM for macOS. Apple provides documentation on the settings and values supported officially by MDM for macOS. The preferences set by the MDM platform for those supported by MDM for macOS are read by a preferences daemon known as cfprefsd. The daemon cfprefsd provides preferences services for the CFPreferences and NSUserDefaults APIs throughout the system. MDM for macOS is only able to set preferences and settings that are defined in those APIs. If an application sets values outside of that, it is not able to be managed by MDM for macOS.

Settings pushed by MDM for macOS are in a format called a configuration profile. The configuration profile typically includes the scope, a unique identifier, display name, description, and payload content. The payload content has the payload type which defines a preferences domain, and preference settings and values.

For files within the scope of MDM for macOS, it is generally easy for an IT administrator to enforce policy: the IT administrator sets the configuration profile and MDM for macOS simply does not allow for the changes in the configuration profile. For example, if Bluetooth is set off in the mobile devices being managed, the user cannot turn it on.

SUMMARY OF THE INVENTION

However, for files to be managed by an MDM system that are outside of the scope of MDM for macOS, one needs to write scripts that check these files for values that do not meet the required configuration. Since MDM for macOS does not support these scripts, third party vendors such as Jamf and Kandji provide support for these scripts. These scripts are pushed by a separate manager to an agent, such as the Jamf or Kandji agent, that runs on each device. The agent typically runs the scripts on a trigger such as check-in with the MDM platform (generally every fifteen minutes), start up, log-in or a time schedule such as once an hour, once a day, or so forth. These scripts are usually complex and require advanced scripting knowledge, although Kandji for example provides simplification of the scripting using a library of prebuilt automations for common scripts. Kandji has a software agent that sits on each enrolled mobile device to run the script. While Kandji's agent can automatically change a setting for program outside of MDM for macOS back to a compliant setting, Kandji's agent typically runs scripts and checks the settings every fifteen minutes or so, as more frequent checking takes computing power and makes a system too "chatty."

Since these scripts run on a schedule it can leave these files misconfigured for that period, potentially leaving organizations vulnerable. The separate manager is also expensive, and even with prebuilt automations is still complex and prone to programming error.

The security issues surrounding macOS devices and especially the issues regarding programs outside the scope of MDM for macOS have been around for over ten years. Over that time, large amounts of research and development and huge investments have been undertaken to simplify the issue surrounding scripts and MDM security for the Apple ecosystem. Jamf, which focuses on the Apple ecosystem, is a publicly-traded company worth billions of dollars, and Kandji, also Apple-focused, has received nine-figure investments.

The present inventor has developed a surprisingly simple and effective way to eliminate the disadvantages of scripting for files outside of MDM for macOS that allows for an agent installed on the macOS of a managed device. The agent can control files outside of MDM for macOS by settings sent via a modified or supplemental MDM platform. Specifically, the present invention provides an MDM platform where files outside of MDM for macOS can be advantageously instantaneously changed back to values defined by the MDM platform. The security issue of timed triggers running scripts is avoided and in fact the use of scripts is eliminated.

The present invention accomplishes these advantages by using an MDM platform, run for example by an administrator, to set the configuration profile for an array of files. Under that array, there exists a file path key and value and content key and value, the content value setting the content desired by the administrator. Also provided are an owner key and value, group key and value, permissions key and value, and the type of content key and value.

Every Apple macOS device has a file manager agent built into the system called fseventsd that receives every file system change from the kernel. The FSEvents API in macOS advantageously allows third-party applications, such as an agent, to register for notifications of changes to a given directory tree. Whenever the filesystem is changed, the kernel passes notifications to fseventsd. This process combines multiple changes to a single directory tree that occur within a short period of time, then notifies any application that has registered for notification of changes to the affected directory. If a file is changed, an FSEvent event is triggered and the agent of the present invention that is installed checks to make sure the changed value still matches the defined content values and if not, the agent of the present invention will instantaneously will change the state back to the desired state in the configuration profile. The agent of the present invention sits on the macOS device and thus can operate even when offline. Unlike files within MDM for macOS, the present invention does not prevent changes to a configuration profile content but rather lets the change occur. Advantageously, the agent of the present invention however uses FSEvent to track the change and change back the setting instantaneously, i.e. via immediate processing which typically is on the order of milliseconds. Unlike solutions using scripts, the defined content values are defined by the administrator using the configuration profile, greatly simplifying programming. Time gaps are eliminated, and security greatly improved. The writing of scripts or use of predefined libraries is eliminated, and overall MDM management is simplified.

The present invention thus provides an MDM platform to manage files outside the scope of MDM for macOS, the management system comprising:

an MDM platform for managing a plurality of mobile devices each with a macOS operating system, the MDM manager allowing for creation of configuration profiles for an array of files outside of the scope of MDM for macOS and the configuration profiles having defined content settings; and a plurality of managed mobile devices having an agent to receive the array of configuration profiles from the MDM platform, the mobile devices each having a module to detect a change in the file outside the scope of MDM for macOS and when the change occurs to check a content change against the defined content settings, and if the change deviates from one of the defined content settings, returning the file to the defined content settings of the configuration profile.

Advantageously, the returning can occur automatically and instantaneously after the change occurs, so that only the time to run the program occurs between the change and the reconfiguring happens, this being on the order of milliseconds. The present invention thus allows for returning to the defined content settings within 10 minutes, a single minute and more advantageously within even a second, and most advantageously within 0.1 seconds.

The array preferably has a file path key and value and content key and value, the content value having the content settings desired by the administrator. It is also preferred to include an owner key and value, a group key and value, and a permissions key and value, to allow for proper security within the operating system when setting these values. For example, the owner value can advantageously be set to root so that only the administrator has control.

The array also highly advantageously provides the type of content key and value, and can set this to a base64 value. Base64 is a binary to a text encoding scheme that represents binary data in an American Standard Code for Information Interchange (ASCII) string format. It's designed to carry data stored in binary format across the channels, and it takes any form of data and transforms it into a long string of plain text. While an IT administrator can write the file content value in the XML of the configuration profile, it is advantageous to use base64 because XML has certain reserved characters that can cause syntax errors if they are in the file content. Converting the file content to base64 prevents syntax issues. The inventor's agent decodes the base64 content to the desired content.

The present invention provides a method for managing files outside the scope of MDM for macOS by defining defined values for the files and checking the files to ensure the corresponding values match the defined values, tracking changes to the files and automatically changing the files back to the defined values if a change does not meet the defined values.

DETAILED DESCRIPTION

Figure 1:
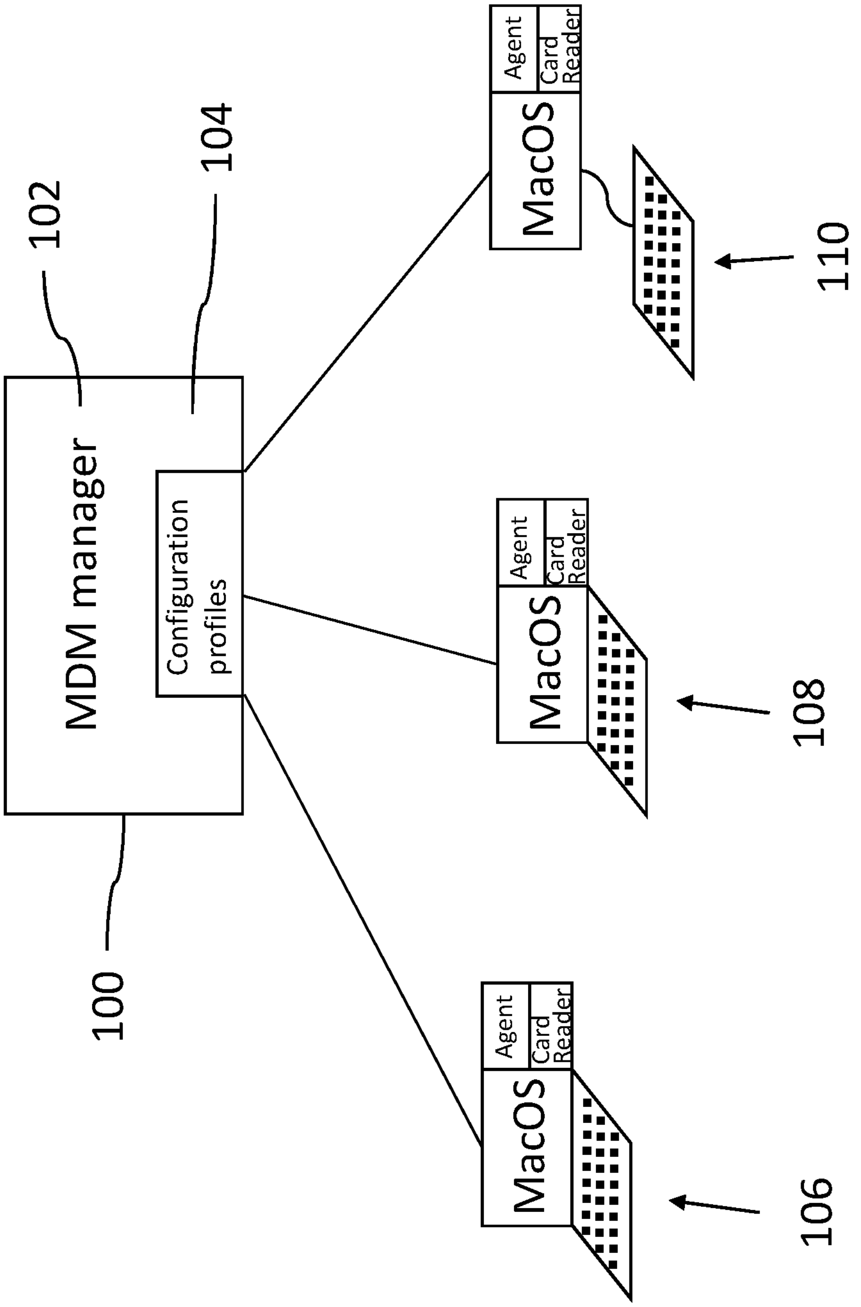
FIG. 1 shows an overview of an embodiment of the present invention.

FIG. 1 shows an overview an embodiment of the present invention is which a computer 100 of an administrator enrolled in MDM for macOS and also an MDM platform 102 of the present invention. The computer has a graphical user interface (GUI) 104 which allow the administrator to define the file content, the owner, the group, and the permissions of files run by a plurality of mobile devices, here laptops 106, 108 and desktop 110, running macOS and allowing files within the scope of MDM for macOS to be controlled by the administrator using MDM for macOS. As examples, the administrator, using a MDM platform for macOS can set a configuration profile for Airdrop, an Apple feature that allows for physically close Apple devices to share files wirelessly with one another, so that Airdrop is off and inactive in each of the mobile devices 106, 108, 110. As another example, the administrator can set a configuration profile for Bluetooth so that none of the mobile devices can use Bluetooth. Another setting within the normal scope of MDM for macOS is for enforcing smartcards, an administrator can set a configuration profile for a smartcard enforcement, so that each device can only operate if a smartcard reader is attached to the macOS device and reads an employee smartcard.

Thus the users of the macOS devices 106, 108, 110 simply will not be able turn on Bluetooth, use Airdrop or run the devices 106, 108, 110 without a smartcard due to the settings pushed down by MDM to computer 100.

The present invention advantageously and surprisingly then also provides similar capability to the administrator for other files outside the scope of MDM for macOS by allowing the administrator to define the file content, the owner, the group, and the permissions of the other files using an MDM platform 102.

For example, Apple provides a client and server called Secure Shell Protocol (SSH) on macOS that allows the devices to connect with a SSH server to allow certain kinds of connections which might be needed by the users of the devices.

A listing of SSH file values that can be set is found for example at https://man7.org/linux/man-pages/man5/ssh_config.5.html.

An administrator can use the MDM platform to set any of the configuration file settings of SSH as desired.

An example of a configuration profile file with settings that can be set to define the SSH values is as follows. The configuration profiles thus can be provided to an IT administrator at GUI 104 and allows the IT administrator to modify, for example by simply removing the hashtag and putting the desired value in the programming code. The hashtagged lines are comments only, and actual settings for SSH start with the Host * line after the hashtag comments.

Configuration Profile File Example

#This is the ssh client system-wide configuration file. See
#ssh_config(5) for more information. This file provides defaults for
#users, and the values can be changed in per-user configuration files
#or on the command line.

```
#Configuration data is parsed as follows:
#1. command line options
#2. user-specific file
#3. system-wide file
#Any configuration value is only changed the first time it is set.
#Thus, host-specific definitions should be at the beginning of the
#configuration file, and defaults at the end.
#Site-wide defaults for some commonly used options. For a comprehensive
#list of available options, their meanings and defaults, please see
#ssh_config(5).
#Host *
#ForwardAgent no
#ForwardX11 no
#PasswordAuthentication yes
#GSSAPIAuthentication no
#GSSAPIDelegateCredentials no
#BatchMode no
#CheckHostIP yes
#AddressFamily any
#ConnectTimeout 0
#StrictHostKeyChecking ask
#IdentityFile ~/.ssh/id_rsa
#IdentityFile ~/.ssh/id_dsa
#IdentityFile ~/.ssh/id_ecdsa
#IdentityFile ~/.ssh/id_ed25519
#Port 22
#MACs hmac-md5,hmac-sha1,umac-64@openssh.com
#EscapeChar ~
#Tunnel no
#TunnelDevice any:any
#PermitLocalCommand no
#VisualHostKey no
#ProxyCommand ssh -q -W % h:% p gateway.example-.com
#RekeyLimit 1G 1h
#UserKnownHostsFile ~/.ssh/known_hosts.d/% k
Host *
  SendEnv LANG LC *
  Ciphers aes128-gcm@openssh.com
  HostbasedAcceptedAlgorithms ecdsa-sha2-nistp256, ecdsa-sha2-nistp256-cert-v01@openssh.com
HostbasedAuthentication yes
HostKeyAlgorithms ecdsa-sha2-nistp256,ecdsa-sha2-nistp256-cert-v01@openssh.com
KexAlgorithms ecdh-sha2-nistp256
MACs hmac-sha2-256
PubkeyAcceptedAlgorithms ecdsa-sha2-nistp256,ecdsa-sha2-nistp256-cert-vO1@openssh.com
CASignatureAlgorithms ecdsa-sha2-nistp256
ServerAliveCountMax 0
ServerAliveInterval 900
```

As mentioned above, only certain settings following the Host * line are set by the administrator, with the hashtagged settings showing defaults but not enforced. The actual set settings include a HostbasedAuthentication setting changed from its default no to be set to yes, and a Cipher, typically default set to chacha20-poly1305@openssh.com, aes128-ctr,aes192-ctr,aes256-ctr, aes128-gcm@openssh.com, aes256-gcm@openssh.com, set solely to aes128-gcm@openssh.com. The other settings set other values for example to improve security.

The likelihood this code would cause issues within XML due to hitting reserved characters is fairly high, as discussed above. The IT administrator thus can convert the entire content code into base64, for example using https://www.base64decode.org/, (here with the hashtagged code though the hashtagged code could be left out).

The array for the ssh setting within the configuration profile that would be used by the MDM platform 102 thus would appear as such:

<dict>
<key>content</key>
<string>IyBUaGlzIGlzIHRoZSBzc2ggY2xpZW50I-
HN5c3RlbS13aWRlIGNvbmZpZ3VyYXRp
b24gZmlsZS4gIFN1ZQojIHNzaF9jb25maWcoN-
SkgZm9yIG1vemUgaW5mb3JtYXRpb24uICB
UaGIzIGZpbGUgcHJvdmlkZXMgZGVmYXVs-
dHMgZm9yCiMgdXNMcnMsIGFuZCBOaGUgd
mFsdWVzIGNhbiBiZSBjaGFuZ2VkIGluIHBlci1-
1c2VyIGNvbmZpZ3VyYXRpb24gZmlsZXM
KIyBvciBvbiBOaGUgY29tbWFuZCBsaW5lLgoK-
IyBDb25maWd1cmFOaW9uIGRhdGEgaXMg
cGFyc2VkIGFzIGZvbGxvd3M6CiMgIDEuIGNv-
bW1hbmQgbGluZSBvcHRpb25zCiMgIDIuIH
VzZXItc3B1Y21maWMgZmlsZQojICAzLiBzeX-
N0ZW0td2lkZSBmaWxlCiMgQW55IGNvbmZ
pZ3VyYXRpb24gdmFsdWUgaXMgb25seSBjaGF-
uZ2VkIHRoZSBmaXJzdCBOaW1IGl0IGIzI
HNldC4KIyBUaHVzLCBob3N0LXNwZWNpZm-
ljIGRIZmluaXRpb25zIHNob3VsZCBiZSBhd
CB0aGUgYmVnaW5uaW5nIG9mIRoZQojIGNv-
bmZpZ3VyYXRpb24gZmlsZSwgYW5kIGR
lZmF1bHRzIGF0IHRoZSBlbmQuCgojIFNpd-
GUtd21kZSBkZWZhdWx0cyBmb3Igc29tZSBjb2
1tb25seSB1c2VkIG9wdGlvbnMuICBGb3IgYS-
Bjb21wcmVoZW5zaXZlCiMgbGlzdCBvZiBhd
mFpbGFibGUgb3B0aW9ucywgdGhlaXIgbWV-
hbmluZ3MgYW5kIGRIZmF1bHRzLCBwbGVh
c2Ugc2VlCiMgc3NoX2NvbmZpZyg1KS4KCi-
MgSG9zdCAqCiMgICBGb3J3YXJkQWdlbnQg
bm8KIyAgIEZvcndhcmRYMTEgbm8KIyAgIF-
Bhc3N3b3JkQXVOaGVudGljYXRpb24geWVz
CiMgICBHU1NBUEIBdXRoZW50aWNhdGlv-
biBubwojICAgR1NTQVBJRGVsZWdhdGVDc
mVkZW50aWFscyBubwojICAgQmFOY2hNb-
2RlIG5vCiMgICBDaGVja0hvc3RJUCB5ZXMKI
yAgIEFkZHJ1c3NGYW1pbHkgYW55CiMgIC-
BDb25uZWNOVG1tZW91dCAwCiMgICBTdHJ
pY3RIb3NOS2V5Q2h1Y2tpbmcgYXNrCiMgIC-
BJZGVudG10eUZpbGUgfi8uc3NoL2lkX3JzYQ
ojICAgSWRlbnRpdHlGaWxlIH4vLnNzaC9p-
ZF9kc2EKIyAgIElkZW50aXR5RmlsZSB+Ly5zc
2gvaWRfZWNkc2EKIyAgIElkZW50aXR5Rmls-
ZSB+Ly5zc2gvaWRfZWQyNTUxOQojICAg
UG9ydCAyMgojICAgTUFDcyBobWFjLW
1kNSxobWFjLXNoYTEsdW1hYy02NEBvcGVuc3
NoLmNvbQojICAgRXNjYXBlQ2hhciB+
CiMgICBUdW5uZWwgbm8KIyAgIFR1bm5lbERldm
ljZSBhbnk6YW55CiMgICBQZXJtaXRMb2Nhb-
ENvbW1hbmQgbm8KIyAgIFZpc3VhbEhvc3R
LZXkgbm8KIyAgIFByb3h5Q29tbWFuZCBzc2gg-
LXEgLVcgJWg6JXAgZ2FOZXdheS5leGFtc
GxlLmNvbQojICAgUmVrZXlMaW1pdCAxRyA-
xaAojICAgVXNlcktub3duSG9zdHNGaWxlIH
4vLnNzaC9rbm93bl9ob3N0cy5kLyVrCgpIb3N0IC-
oKICAgIFNlbmRFbnYgTEFORyBMQ18qC
iAgICBDaXBoZXJzIGFlczEyOC1nY21Ab3Blbn-
NzaC5jb20KICAgIEhvc3RiYXN1ZEFjY2Vw
dGVkQWxnb3JpdGhtcyBlY2RzYS1zaGEyLW5-
pc3RwMjU2LGVjZHNhLXNoYTItbmlzdHAy NTYtY2VydC12MDFAb3BlbnNzaC5jb20KICAgIE-
hvc3RiYXNlZEF1dGhlbnRpY2F0aW9uIHl
lcwogICAgSG9zdEtleUFsZ29yaXRobXMgZWNk-
c2Etc2hhMi1uaXN0cDI1NixlY2RzYS1zaGE
yLW5pc3RwMjU2LWNlcnQtdjAxQG9wZW5zc-
2guY29tCiAgICBLZXhBbGdvcml0aGlzIGVj
ZGgtc2hhMi1uaXN0cDI1NgogICAgTUFDcyBob-
WFjLXNoYTItMjU2CiAgICBQdWJrZX1BY
2NlcHR1ZEFsZ29yaXRobXMgZWNkc2Etc2h-
hMi1uaXN0cDI1NixlY2RzYS1zaGEyLW5pc3R
wMjU2LWNlcnQtdjAxQG9wZW5zc2guY29tCi-
AgICBDQVNpZ25hdHVyZUFsZ29yaXRobX
MgZWNkc2Etc2hhMi1uaXN0cDI1NgogICAg-
U2VydmVyQWxpdmVDb3VudE1heCAwCiAgI
CBTZXJ2ZXJBbGl2ZUludGVydmFsIDkwMAo=</
string>
<key>group</key>
<string>staff</string>
<key>owner</key>
<string>root</string>
<key>path</key>
<string>/etc/ssh/ssh_config</string>
<key>perm</key>
<string>644</string>
<key>type</key>
<string>base64</string>
</dict>

Each file for the array thus has a series of settings between the <dict> and </dict> lines that can be pushed to the macOS device and read by the agent of the present invention of each enrolled mobile device. Thus, when an IT administrator desires the change in the HostbasedAuthentication from no to yes, the MDM platform sends the array for all the files outside of MMD for macOS to all the enrolled mobile devices and the agent of the present invention then receives the change.

The use of the configuration profiles to enforce the MDM settings is highly advantageous and allows for easy setting in an XML setting that IT administrators are familiar with. No scripts are needed If for example, the IT administrator wanted to set a hashtagged default setting so that it is always enforced that the host IP address is always checked, the administrator simply can move the hashtag line for #CheckHostIP yes to after the Host * in the program code and delete the hashtag. Further GUI features can be provided to automate this procedure.

While the above change has been explained above for simplicity, the actual configuration profile for SSH with the string code above that would be sent by the MDM platform to fully run the with the code described hereinafter is the following, which is included at the end of the specification and before the claims and titled FULL CONFIGURATION PROFILE.

For each managed file, the configuration files thus can be used, so that for example SSH, and other configuration files for things such as SUDO and OpenBSM Audit, also outside the scope of MDM for macOS can be managed by the MDM manager 102.

For example, SUDO allows a user to run command with root level conditions. One command for SUDO is passwd_tries, which is default set to 3. If an administrator wanted to permit solely 2 password tries to increase security, the configuration file would be set to passwd_tries=2. This would be converted to base64 and file path content would be set to /etc/sudoers, which is the file path for SUDO.

For OpenBSM Audit, the file path is /etc/security/audit control, and the content can be controlled so that various events such as logging, authentication and authorization, admin, file write, file modify, file delete, exec, other, and non-attributable actions can be logged using a line such as: flags:lo,aa,ad,fw,fm,fd,ex,aa,ua,pm,ot,na.

The SUDO and OpenBSM Audit settings and commands, and any other files outside of the normal scope of MDM for macOS, thus would sit between separate <dict> and </dict> lines in the array, with the configuration file content in base64 as per the above.

This array of files is then pushed by MDM platform 102 to each device 106, 108, 110. It only needs to be pushed again if there are changes to the array of files.

Figure 2:
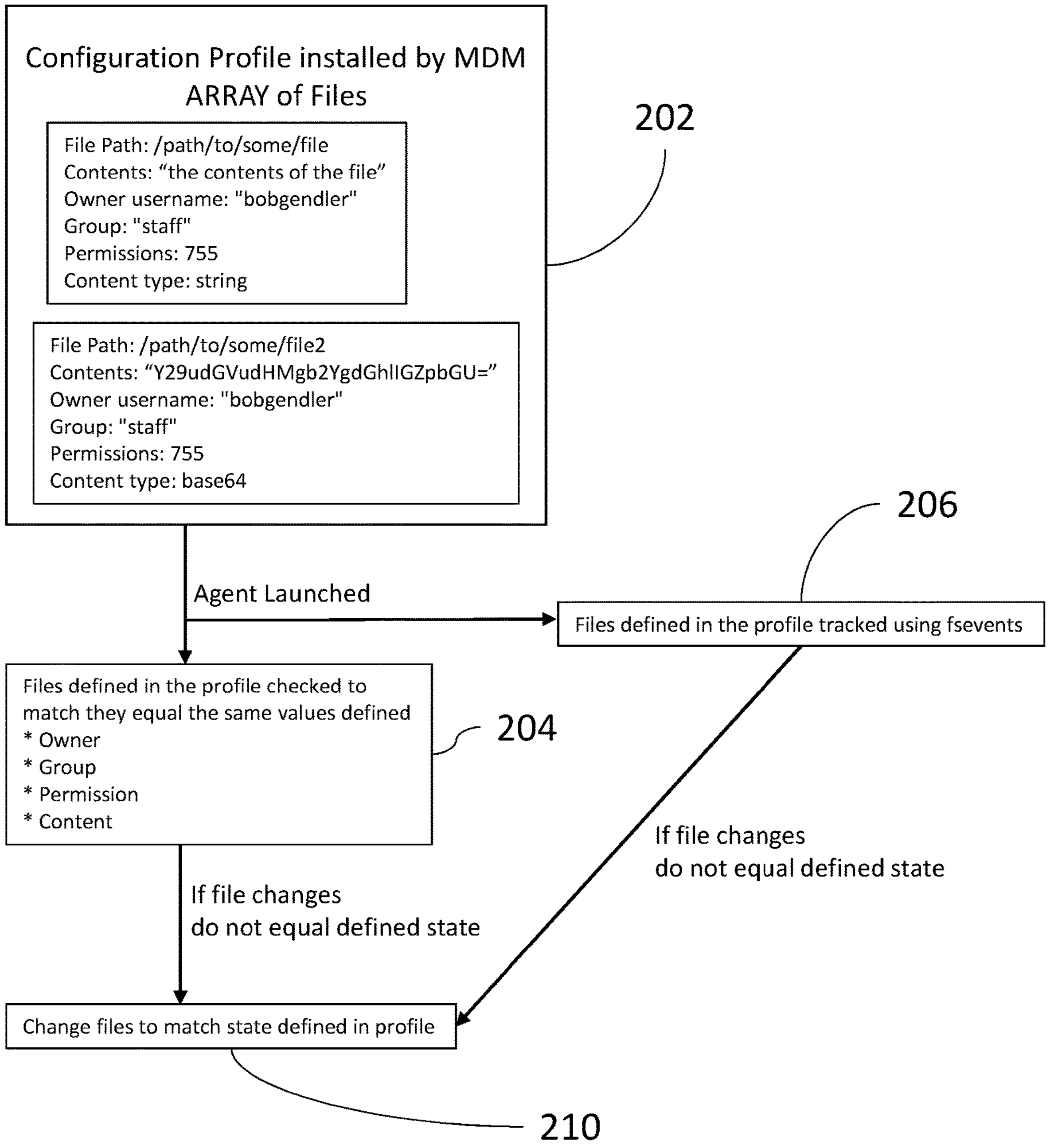
FIG. 2 shows a flow chart of the method of the agent of the present invention having an MDM agent for managing files defined by a supplemental MDM platform outside the scope of the MDM for macOS.

FIG. 2 shows a flowchart where an MDM agent at the device 106, 108, 110 has received an array of files, at which time the agent is launched. The macOS device receives the configuration profile and the settings are read by the inventor's agent which parses the array, so that each file path and configuration file content (as well as owner, group, permissions and content type) is read.

The agent then reads the array of file paths and checks these files to make sure they match the defined values in step 204. If the files do not match for each enrolled device 106, 108, 110 will change them accordingly in step 210.

Then, the agent runs continuously at step 206 and makes use of Apple's FSEvent (file system events) API to track the changes of each of these files. If the file is changed at all, an FSEvent event is triggered and the application checks to make sure it still matches the defined values and if it does not, it will change the state back to the desired state in the configuration profile in step 210.

An example of code to run the flowchart to run in Swift includes a main.swift program that is run by a launchdaemon. A daemon is a program running in the background without requiring user input. A typical daemon might for instance perform maintenance tasks or scan a device for malware when it is connected. The launchdeamon launches the agent and keeps it running on each device 106, 108, 110, and ensure that if any changes are made, the configuration is set instantaneously back to the content defined in the configuration profile. A preferred embodiment of the code is provided as main.swift, with comments following the forward slashes, at the end of the specification before the claims.

The agent runs the main.swift program and looks for changes in any of the configuration profile preferences. The code for reading the content in the configuration profile as well as identifying changes in files defined in the array of files is for example in the FileChanges.swift program also run by the agent, and provided with comments at the end of the specification before the claims.

The Filechanges.Swift program has an overwrite section so that if a change is pushed to the device, the configuration profile is overwritten. A permissions section checks to make sure the permission for the change is correct.

The Filechanges.swift program also calls FSEvents in an FSEvents call section and checks for any user changes. The Filechanges.swift then also has a return section that automatically and instanteously returns the managed device setting to the configuration profiles setting if there is any deviation. Thus, unlike files managed withing MDM for macOS, the agent allows the setting to be changes, but then instanteously switches the steeing back to the configuration profile setting.

The present embodiment thus provides an MDM management system that has an MDM platform allowing for an IT administrator to provide configuration profile settings for files outside of the scope of MDM for macOS, and an agent running the main.swift and FileChanges.swift programs.

The present invention thus allows for an incredibly secure and easy way to manage file outside of the scope of MDM for macOS. The configuration settings are returned immediately, so that for example no time for hackers to undertake nefarious actions is possible. In addition, both enrollment and changes to setting are simplified. Just as an example, to undertake to keep SSH to keep HostbasedAuthentication to yes, one would have to write a script such as the following:

```
#!/bin/bash
config=“$(/usr/bin/grep -iE “hostbasedauth” /etc/ssh/ssh_config/usr/bin/grep -v “^#”|/usr/bin/awk -F” |= “‘{print $2}’)”
if [[“$(config)” !=“yes”]]; then
    /usr/bin/grep -iq ‘^hostbasedauth’ /etc/ssh/ssh_config && /usr/bin/sed -i.bak ‘s/.^hostbasedauth.*/hostbasedauth yes/gI’ /etc/ssh/ssh_config || /bin/echo ‘hostbasedauth yes’>>/etc/ssh/ssh_config
Fi.
```

With the present invention, the administrator simply changes or provides one unhashtagged line in the SSH configuration profile, HostbasedAuthentication yes. Not only is the setting easier, but the agent then ensures that SSH is instantaneously returned to require HostbasedAuthentication while the prior art script solution typically only would be run every fifteen minutes or longer. The present invention thus also provides not only a more secure but also a more efficient managed device as the processing time is reduced.

The present invention thus provides a method for managing files outside the scope of MDM for macOS, the method comprising:

allowing an administrator to define configuration profile values for files outside the scope of MDM for macOS;

providing each of a plurality of managed devices running macOS with an agent launched by a launchdaemon;

pushing the defined configuration profile values to the plurality of managed devices running macOS, the agents receiving the defined configuration profile values and the agent setting the files outside the scope of MDM for macOS to the defined configuration profile values, the agent checking for user changes by a user to the files outside the scope of MDM for macOS by calling FSEvents and if the user changes deviate from the defined configuration profile values, returning the file to the defined content settings of the configuration profiles.

FULL CONFIGURATION PROFILE

```
?xml version="1.0" encoding="UTF-8"?>
    <!DOCTYPE plist PUBLIC "-//Apple//DTD PLIST 1.0//EN"
"http://www.apple.com/DTDs/PropertyList-1.0.dtd">
    <plist version="1.0">
    <dict>
      <key>PayloadContent</key>
      <array>
        <dict>
          <key>PayloadEnabled</key>
          <true/>
          <key>PayloadIdentifier</key>
          <string>2e03f882-4744-40c4-88e1-47e38d9337cd</string>
          <key>PayloadType</key>
          <!-- Defines the preferences domain to write configuration to -->
          <!-- The agent has the Apple bundle identifier of com.truetalentinc.configtool -->
          <!-- This name would depend on what the config tool bundle ID is -->
          <string>com.truetalentinc.configtool</string>
          <!-- Unique UUID required for the payload content -->
          <key>PayloadUUID</key>
          <string>2e03f882-4744-40c4-88e1-47e38d9337cd</string>
          <key>PayloadVersion</key>
          <integer>1</integer>
          <!-- Files array -->
          <key>files</key>
            <array>
            <!-- Each individual file -->
              <dict>
              <!-- Content defined in base64 -->
                <key>content</key>
```

<string>IyBUaGlzIGlzIHRoZSBzc2ggY2xpZW50IHN5c3RlbS13aWRlIGNvbmZpZ3VyYXRp
b24gZmlsZS4gIFNlZQojIHNzaF9jb25maWcoNSkgZm9yIG1vcmUgaW5mb3JtYXRpb24uICB
UaGlzIGZpbGUgcHJvdmlkZXMgZGVmYXVsdHMgZm9yCiMgdXNlcnMsIGFuZCB0aGUgd
mFsdWVzIGNhbiBiZSBjaGFuZ2VkIGluIHBlci11c2VyIGNvbmZpZ3VyYXRpb24gZmlsZXM
KIyBvciBvbiB0aGUgY29tbWFuZCBsaW5lLgoKIyBDb25maWd1cmF0aW9uIGRhdGEgaXMg
cGFyc2VkIGFzIGZvbGxvd3M6CiMgIDEuIGNvbW1hbmQgbGluZSBvcHRpb25zCiMgIDIuIH
VzZXItc3BlY2lmaWMgZmlsZQojICAzLiBzeXN0ZW0td2lkZSBmaWxlCiMgQW55IGNvbmZ
pZ3VyYXRpb24gdmFsdWUgaXMgb25seSBjaGFuZ2VkIHRoZSBmaXJzdCB0aW1lIGl0IGlzI
HNldC4KIyBUaHVzLCBob3N0LXNwZWNpZmljIGRlZmluaXRpb25zIHNob3VsZCBiZSBhd
CB0aGUgYmVnaW5uaW5nIG9mIHRoZQojIGNvbmZpZ3VyYXRpb24gZmlsZSwgYW5kIGR
lZmF1bHRzIGF0IHRoZSBlbmQuCgojIFNpdGUtd2lkZSBkZWZhdWx0cyBmb3Igc29tZSBjb2
1tb25seSB1c2VkIG9wdGlvbnMuICBGb3IgYSBjb21wcmVoZW5zaXZlCiMgbGlzdCBvZiBhd
mFpbGFibGUgb3B0aW9ucywgdGhlaXIgbWVhbmluZ3MgYW5kIGRlZmF1bHRzLCBwbGVh
c2Ugc2VlCiMgc3NoX2NvbmZpZyg1KS4KCiMgSG9zdCAqCiMgICBGb3J3YXJkQWdlbnQg
bm8KIyAgIEZvcndhcmRYMTEgbm8KIyAgIFBhc3N3b3JkQXV0aGVudGljYXRpb24geWVz
CiMgICBHU1NBUElBdXRoZW50aWNhdGlvbiBubwojICAgR1NTQVBJRGVsZWdhdGVDc
mVkZW50aWFscyBubwojICAgQmF0Y2hNb2RlIG5vCiMgICBDaGVja0hvc3RJUCB5ZXMKI
yAgIEFkZHJlc3NGYW1pbHkgYW55CiMgICBDb25uZWN0VGltZW91dCAwCiMgICBTdHJJ
pY3RIb3N0S2V5Q2hlY2tpbmcgYXNrCiMgICBJZGVudGl0eUZpbGUgfi8uc3NoL2lkX3JzYQ
ojICAgSWRlbnRpdHlGaWxlIH4vLnNzaC9pZF9kc2EKIyAgIElkZW50aXR5RmlsZSB+Ly5zc
2gvaWRfZWNkc2EKIyAgIElkZW50aXR5RmlsZSB+Ly5zc2gvaWRfZWQyNTUxOQojICAg
UG9ydCAyMgojICAgTUFDcyBobWFjLW1kNSxobWFjLXNoYTEsdW1hYy02NEBvcGVuc3
NoLmNvbQojICAgRXNjYXBlQ2hhciB+CiMgICBUdW5uZWwgbm8KIyAgIFR1bm5lbERldm
ljZSBhbnk6YW55CiMgICBQZXJtaXRMb2NhbENvbW1hbmQgbm8KIyAgIFZpc3VhbEhvc3R
LZXkgbm8KIyAgIFByb3h5Q29tbWFuZCBzc2ggLXEgLVcgJWg6JXAgZ2F0ZXdheS5leGFtc
GxlLmNvbQojICAgUmVrZXlMaW1pdCAxRyAxaAojICAgVXNlcktub3duSG9zdHNGaWxlIH
4vLnNzaC9rbm93bl9ob3N0cy5kLyVrCgpIb3N0ICoKICAgIFNlbmRFbnYgTEFORyBMQ18qC
iAgICBDaXBoZXJzIGFlczEyOC1nY21Ab3BlbnNzaC5jb20KICAgIEhvc3RiYXNlZEFjY2Vw
dGVkQWxnb3JpdGhtcyBlY2RzYS1zaGEyLW5pc3RwMjU2LGVjZHNhLXNoYTItbmlzdHAy
NTYtY2VydC12MDFAb3BlbnNzaC5jb20KICAgIEhvc3RiYXNlZEF1dGhlbnRpY2F0aW9uIHl

```
lcwogICAgSG9zdEtleUFsZ29yaXRobXMgZWNkc2Etc2hhMi1uaXN0cDI1NixlY2RzYS1zaGE
yLW5pc3RwMjU2LWNlcnQtdjAxQG9wZW5zc2guY29tCiAgICBLZXhBbGdvcml0aG1zIGVj
ZGgtc2hhMi1uaXN0cDI1NgogICAgTUFDcyBobWFjLXNoYTItMjU2CiAgICBQdWJrZXlBY
2NlcHRlZEFsZ29yaXRobXMgZWNkc2Etc2hhMi1uaXN0cDI1NixlY2RzYS1zaGEyLW5pc3R
wMjU2LWNlcnQtdjAxQG9wZW5zc2guY29tCiAgICBDQVNpZ25hdHVyZUFsZ29yaXRobX
MgZWNkc2Etc2hhMi1uaXN0cDI1NgogICAgU2VydmVyQWxpdmVDb3VudE1heCAwCiAgI
CBTZXJ2ZXJBbGl2ZUludGVydmFsIDkwMAo=
          </string>
          <!-- Desired Group permission -->
          <key>group</key>
          <string>wheel</string>
          <!-- Desired owner permission -->
          <key>owner</key>
          <string>root</string>
          <!-- Path for the file -->
          <key>path</key>
          <string>/etc/ssh/sshd_config</string>
          <!-- Desired permissions in unix octal format -->
          <key>perm</key>
          <string>644</string>
          <!-- Type of content base64 or string -->
          <key>type</key>
          <string>base64</string>
        </dict>
        <!-- File 2 in the example -->
        <dict>
        <!-- Content defined as a string -->
          <key>content</key>
          <string>#
   # $P4: //depot/projects/trustedbsd/openbsm/etc/audit_control#8 $
   #
```

```
dir:/var/audit
flags:lo,aa
minfree:5
naflags:lo,aa
policy:cnt,argv
filesz:2M
expire-after:10M
superuser-set-sflags-mask:has_authenticated,has_console_access
superuser-clear-sflags-mask:has_authenticated,has_console_access
member-set-sflags-mask:
member-clear-sflags-mask:has_authenticated</string>
                <key>group</key>
                <string>wheel</string>
                <key>owner</key>
                <string>root</string>
                <key>path</key>
                <string>/etc/security/audit_control</string>
                <key>perm</key>
                <string>400</string>
                <!-- Type of content defined here -->
                <key>type</key>
                <string>string</string>

            </dict>
          </array>
      </dict>
    </array>
    <!-- All below is required by the standard defined by Apple -->
    <!--
https://developer.apple.com/documentation/devicemanagement/configuring_multiple_devices_us
ing_profiles -->
```

```
    <!-- Description is user defined with a display description -->
    <key>PayloadDescription</key>
    <string>write unix style config files</string>
    <!-- Display name, user defined -->
    <key>PayloadDisplayName</key>
    <string>Bob's Tool</string>
    <!-- Payload identifier to help identify -->
    <key>PayloadIdentifier</key>
    <string>com.configtool.configuration</string>
    <!-- Organization, user defined -->
    <key>PayloadOrganization</key>
    <string>TEST Company</string>
    <key>PayloadRemovalDisallowed</key>
    <true/>
    <key>PayloadScope</key>
    <string>System</string>
    <key>PayloadType</key>
    <string>Configuration</string>
    <!-- Unique UUID for the configuration profile -->
    <key>PayloadUUID</key>
    <string>cdf1a040-d787-425e-80be-79cd39da4cce</string>
    <key>PayloadVersion</key>
    <integer>1</integer>
</dict>
</plist>
```

MAIN.SWIFT

```
////
//// main.swift
//// configtool
////
//// Created by Bob Gendler on 12/1/22.
////
//
import Foundation
import ServiceManagement
import os.log
//
enum preferenceError: Error {
    case plistIncorrect
    case permValueIncorrect

}
// create launchdaemon using the new SMAppService method in macOS 13.
let appService = SMAppService.daemon(plistName: "com.truetalentinc.configtool.plist")
if appService.status != .enabled {
    do {
        try appService.register()
//       print("service not enabled but trying")
        os_log("Starting daemon service")
    } catch {
//       print("service not enabled")
        os_log("service not enabled")
    }

} else {
```

```
    os_log("service enabled")
//   print("service enabled")
}
//



class Observer: NSObject {
    override init() {
        super.init()
        UserDefaults.standard.addObserver(self, forKeyPath: "files", options:
[NSKeyValueObservingOptions.new], context: Optional<UnsafeMutableRawPointer>.none)
    }

    deinit {
        UserDefaults.standard.removeObserver(self, forKeyPath: "files", context:
Optional<UnsafeMutableRawPointer>.none)
    }

    override func observeValue(forKeyPath keyPath: String?, of object: Any?, change:
[NSKeyValueChangeKey : Any]?, context: UnsafeMutableRawPointer?) {
//observe for changes in the preferences
        if let path =
Bundle.main.resourceURL?.deletingLastPathComponent().deletingLastPathComponent().absolut
eString {
//restart application if changes exist
            os_log("restart \(path)")
            _ = Process.launchedProcess(launchPath: "/usr/bin/open", arguments: [path +
"/Contents/MacOS/configtool"])
            main()
        }
    }
```

```
}

public func main() -> Void {
    // Begin observing standardUserDefaults.
    let observer = Observer()

    _ = observer // silence "constant never used" warning
//read preference array
        if let prefs = UserDefaults.standard.array(forKey: "files") {

            for x in prefs {
                guard let filedict = x as? [AnyHashable: Any] else {
                    os_log("plist error")

                    return
                }
                _ = ComplianceClass(filedict: filedict)
            // here the main.swift program references the FileChanges.swift program below
            }

        } else {
//error and quit if no files listed in array
            os_log("Missing files key in plist")
            print(UserDefaults.standard.dictionaryRepresentation().map{print("\($0.key):
\($0.value)")})
            exit(1)
        }


    //make the application never quit
    RunLoop.current.run()
```

```
}

main() //run from main thread with stdin
```

FILECHANGES.SWIFT

```
// FileChanges.swift
// configtool
//
// Created by Bob Gendler on 12/4/22.
//

import Foundation
import System
import os.log

extension DispatchSourceFileSystemObject {
   var dataStrings: [String] {
      var s = [String]()
      if data.contains(.all)      { s.append("all") }
      if data.contains(.attrib)   { s.append("attrib") }
      if data.contains(.delete)   { s.append("delete") }
      if data.contains(.extend)   { s.append("extend") }
      if data.contains(.funlock)  { s.append("funlock") }
      if data.contains(.link)     { s.append("link") }
      if data.contains(.rename)   { s.append("rename") }
      if data.contains(.revoke)   { s.append("revoke") }
      if data.contains(.write)    { s.append("write") }
      return s
   }
}

class ComplianceClass {
//  see Compliance Class in main.swift above
//   var filedict = Dictionary<AnyHashable, Any>()
   var filedict = [AnyHashable : Any]()
```

```
   var path = String()
   var updated = false

   init(filedict: [AnyHashable : Any]){
      //when instance is initialized, set filedict to the dictionary entry
      //if file exists, check for updates
      //if it wasn't updated, also watch it
      self.filedict = filedict
//      guard let filepath = self.filedict["path"] else { return }
      guard let filepath = self.filedict["path"] as? String else { return }
      if FileManager.default.fileExists(atPath: filepath){
         self.UpdateFile()
         if self.updated == false {
            self.FileChanges(filePath: filepath)
         }
      } else {
         self.UpdateFile()
      }
   }

   func ParsePlist() throws -> (filepath: String?, filedata: Data?, attributes: [FileAttributeKey :
Any]?){
      //parse plist
      guard let filepath = self.filedict["path"] as? String else { throw
preferenceError.plistIncorrect }

      var filedata:Data?
      //if it doesn't have content or type
      //content is nil
      if self.filedict["content"] == nil || self.filedict["type"] == nil {
         filedata = nil
```

```
        //if content and type are nil, we're just checking the permissions


    } else {
        //process content - check if it's a string or base64 and decode
//          guard let contentType = self.filedict["type"] else { throw preferenceError.plistIncorrect
}
        guard let contentType = self.filedict["type"] as? String else { throw
preferenceError.plistIncorrect }


        if contentType.lowercased() == "string" {
//              guard let filecontents = self.filedict["content"] else { throw
preferenceError.plistIncorrect }
            guard let filecontents = self.filedict["content"] as? String else { throw
preferenceError.plistIncorrect }


            filedata = filecontents.data(using: .utf8)
        } else if contentType.lowercased() == "base64" {
//              guard let base64Encoded = self.filedict["content"] else { throw
preferenceError.plistIncorrect  }
            guard let base64Encoded = self.filedict["content"] as? String else { throw
preferenceError.plistIncorrect }
            if let decodedData = Data(base64Encoded: base64Encoded) {


                filedata = String(data: decodedData, encoding: .utf8)!.data(using: .utf8)
            }
        }
    }
    //process permissions and ownership from dictionary
    guard let perm = self.filedict["perm"] else { throw preferenceError.plistIncorrect }
    guard let owner: NSString = self.filedict["owner"] as? NSString else { throw
preferenceError.plistIncorrect }
```

```
        guard let group: NSString = self.filedict["group"] as? NSString else { throw
preferenceError.plistIncorrect }
        let Num = String(describing: perm)

        if let mod = Int16(Num, radix: 8) {

            let attributes: [FileAttributeKey: Any] = [FileAttributeKey.posixPermissions: mod,
FileAttributeKey.ownerAccountName: owner, FileAttributeKey.groupOwnerAccountName:
group]
            if let filedata = filedata {
                return(filepath,filedata,attributes)

            } else {
                return(filepath,nil,attributes)
            }

        }
        return(nil,nil,nil)
    }

            // the following section checks the files, for example the parsed SSH configuration
    private func UpdateFile() {

        do {
            //parse the plist
            let parsed = try self.ParsePlist()
            var needUpdated = 0

            if self.filedict["type"] == nil || self.filedict["content"] == nil || parsed.filedata == nil{
                //update permissions only
                if let filepath = parsed.filepath, let attributes = parsed.attributes {
```

```
guard let perm = self.filedict["perm"] else { throw preferenceError.plistIncorrect }
guard let owner: NSString = self.filedict["owner"] as? NSString else { throw
preferenceError.plistIncorrect }
guard let group: NSString = self.filedict["group"] as? NSString else { throw
preferenceError.plistIncorrect }
let Num = String(describing: perm)

guard let mod = Int16(Num, radix: 8) else { throw
preferenceError.permValueIncorrect }
if let currentAttributes = try? FileManager.default.attributesOfItem(atPath: filepath)
{

  if currentAttributes[FileAttributeKey.posixPermissions] as! Int16 != mod ||
currentAttributes[FileAttributeKey.groupOwnerAccountName] as! NSObject != group ||
currentAttributes[FileAttributeKey.ownerAccountName] as! NSObject != owner {
    needUpdated += 1

  }
}

if needUpdated != 0 {
  if FileManager.default.fileExists(atPath: filepath){
    do {
    try FileManager.default.setAttributes(attributes, ofItemAtPath: filepath)
      os_log("\(filepath) File permissions updated successfully.")
    } catch {
      os_log("\(filepath) File permissions not updated successfully.")
    }
  }
} else {
```

```
        os_log("\(filepath) File permissions are fine, no changes")
      }
    } else {
      print("failure failure \(String(describing: parsed.filepath))")


    }
    return
  }
  //update full file if filedata exist
  if let filepath = parsed.filepath, let filedata = parsed.filedata, let attributes =
parsed.attributes {

  // here the contents of the configuration file are read, for example the SSH configuration
    do {
      let currentContents = try String(contentsOf: URL(fileURLWithPath: filepath),
encoding: .utf8)

        // here the program check for changes and will see that for example Hostbased
        //Authentication has changed in SSH.  If nothing had changed nothing changes.
      if String(decoding: filedata, as: UTF8.self) != currentContents {
        needUpdated += 1
      } else {
        needUpdated += 0
      }



    } catch {
      needUpdated += 2
    }

  // this is a permissions section that checks permissions for the changes
```

```
guard let perm = self.filedict["perm"] else { throw preferenceError.plistIncorrect }
guard let owner: NSString = self.filedict["owner"] as? NSString else { throw
preferenceError.plistIncorrect }
guard let group: NSString = self.filedict["group"] as? NSString else { throw
preferenceError.plistIncorrect }
let Num = String(describing: perm)

guard let mod = Int16(Num, radix: 8) else { throw preferenceError.permValueIncorrect
}
if let currentAttributes = try? FileManager.default.attributesOfItem(atPath: filepath) {

  if currentAttributes[FileAttributeKey.posixPermissions] as! Int16 != mod ||
currentAttributes[FileAttributeKey.groupOwnerAccountName] as! NSObject != group ||
currentAttributes[FileAttributeKey.ownerAccountName] as! NSObject != owner {
    needUpdated += 1
  }
} else {
  needUpdated += 2
}

// this is an overwrite section that for example overwrites a file with changes
// in this case would just overwrite the SSH file if that is all that changes
//files without changes are not overwritten
if needUpdated != 0 {

  if (FileManager.default.createFile(atPath: filepath, contents: filedata, attributes:
attributes)) {
    if FileManager.default.fileExists(atPath: filepath){
      //even though it's "updating" it's creating a new file at the location
      os_log("\(filepath) File updated successfully.")
    } else {
```

```
                //create new file
                os_log("\(filepath) File created successfully.")

              }
              self.updated = true
              self.FileChanges(filePath: filepath)
            } else {
              os_log("\(filepath) File not created.")
              return
            }
          } else {
            os_log("\(filepath) is fine, no changes")
          }
        }
      } catch {
        print(error)
      }
    }
```

```
// the following calls FSEvents and if a change is made on the enrolled MDM device that does
// not conform the configuration profile, the changes is instanteously returned to the
// configuration profile.  For example, if a user turns HOSTbased authentication in SSH to
// no, the agent instaneously and automatically returns the setting  HOSTbased authentication to
// yes.

    private func FileChanges(filePath: String) {
      //watch filepath for changes
      print("Watching \(filePath)")
      do {
        let fdesc = try FileDescriptor.open(filePath, .readOnly, options: .eventOnly)
```

```
            let source = DispatchSource.makeFileSystemObjectSource(fileDescriptor:
fdesc.rawValue, eventMask: .all, queue: .global())
            source.setEventHandler {

              let event = source.data
              os_log("\(filePath): \(String(describing: event))")
              if event.contains(.delete) || event.contains(.rename) {
                do {
//                    print("close fdesc")
                  //close the fsevent so we dont make too many events and cause memory issues
                  try fdesc.close()
                  self.UpdateFile()
                } catch {
                  print(error)
                }
              } else {
                self.UpdateFile()
              }

            }

            source.resume()

          } catch {
            print(error)
          }
        }



}
```

What is claimed is:

1. An MDM management system to manage files outside the scope of MDM for macOS, the management system comprising:

an MDM platform for managing a plurality of mobile devices each with a macOS operating system, the MDM platform allowing for creation of configuration profiles for an array of files outside of the scope of MDM for macOS, the configuration profiles having defined content settings; and a plurality of managed mobile devices having an agent to receive the configuration profiles for the array of files to be managed from the MDM platform, the agent detecting a change in the array of files outside the scope of MDM for macOS and when the change occurs the agent checking a content change against the defined content settings, and if the change deviates from one of the defined content settings, returning the file to the defined content settings of the configuration profiles.

2. The MDM management system as recited in claim 1 wherein the returning occurs automatically and instantaneously after the change occurs.

3. The MDM management system as recited in claim 1 wherein occurs within a second from a detection of the change.

4. The MDM management system as recited in claim 1 wherein occurs within a tenth of a second from a detection of the change.

5. The MDM management system as recited in claim 1 wherein the array has a file path key and value and content key and value for each managed file.

6. The MDM management system as recited in claim 5 wherein the array also has an owner key and value, a group key and value, and a permissions key and value.

7. The MDM management system as recited in claim 5 wherein the content value is in a numerical base form.

8. The MDM management system as recited in claim 5 wherein the content value is in base64.

9. A method for managing files outside the scope of MDM for macOS, the method comprising:

allowing an administrator to define configuration profile values for an array of files outside the scope of MDM for macOS;

providing each of a plurality of managed devices running macOS with an agent launched by a launchdaemon;

pushing the defined configuration profile values to the plurality of managed devices running macOS, the agents receiving the defined configuration profile values and the agent setting the files outside the scope of MDM for macOS to the defined configuration profile values, the agent checking for user changes by a user to the files outside the scope of MDM for macOS by calling FSEvents and if the user changes deviate from the defined configuration profile values, returning the file to the defined content settings of the configuration profiles.

10. The method as recited in claim 9 wherein the returning occurs automatically and instantaneously after the change occurs.

11. The method as recited in claim 10 wherein occurs within a second from a detection of the change.

12. The method as recited in claim 11 wherein occurs within a tenth of a second from a detection of the change.

13. The method as recited in claim 9 wherein the array has a file path key and value and content key and value for each managed file.

14. The method as recited in claim 13 wherein the array also has an owner key and value, a group key and value, and a permissions key and value.

15. The method as recited in claim 13 wherein the content value is in a numerical base form.

16. The method as recited in claim 13 wherein the content value is in base64.

* * * * *